United States Patent
Debnath et al.

(10) Patent No.: US 10,740,170 B2
(45) Date of Patent: Aug. 11, 2020

(54) STRUCTURE-LEVEL ANOMALY DETECTION FOR UNSTRUCTURED LOGS

(71) Applicant: NEC Laboratories America, Inc., Princeton, NJ (US)

(72) Inventors: Biplob Debnath, Princeton, NJ (US); Hui Zhang, Princeton Junction, NJ (US); Guofei Jiang, Princeton, NJ (US)

(73) Assignee: NEC Corporation (JP)

( * ) Notice: Subject to any disclaimer, the term of this patent is extended or adjusted under 35 U.S.C. 154(b) by 309 days.

(21) Appl. No.: 15/830,579

(22) Filed: Dec. 4, 2017

(65) Prior Publication Data

US 2018/0165147 A1 Jun. 14, 2018

Related U.S. Application Data

(60) Provisional application No. 62/544,949, filed on Aug. 14, 2017, provisional application No. 62/431,513, filed on Dec. 8, 2016.

(51) Int. Cl.
| | |
|---|---|
| *G06F 11/07* | (2006.01) |
| *G06F 11/30* | (2006.01) |
| *G06F 11/34* | (2006.01) |
| *G06F 16/22* | (2019.01) |
| *G06F 16/28* | (2019.01) |
| *G06F 40/205* | (2020.01) |

(52) U.S. Cl.
CPC ...... *G06F 11/0793* (2013.01); *G06F 11/0709* (2013.01); *G06F 11/0766* (2013.01); *G06F 11/0787* (2013.01); *G06F 11/3006* (2013.01); *G06F 11/3476* (2013.01); *G06F 16/22* (2019.01); *G06F 16/285* (2019.01); *G06F 40/205* (2020.01)

(58) Field of Classification Search
CPC ............. G06F 11/0793; G06F 11/0709; G06F 11/0766; G06F 11/0787; G06F 11/3006; G06F 11/3476; G06F 16/22; G06F 17/2705
See application file for complete search history.

(56) References Cited

U.S. PATENT DOCUMENTS

| | | | |
|---|---|---|---|
| 8,386,953 B1 * | 2/2013 | Young | G06F 16/242 715/780 |
| 8,495,429 B2 | 7/2013 | Fu et al. | |
| 2006/0184529 A1 * | 8/2006 | Berg | G06F 11/0709 |

(Continued)

*Primary Examiner* — Yolanda L Wilson
(74) *Attorney, Agent, or Firm* — Joseph Kolodka

(57) ABSTRACT

A computer-implemented method, computer program product, and computer processing system are provided. The method includes preprocessing, by a processor, a set of heterogeneous logs by splitting each of the logs into tokens to obtain preprocessed logs. Each of the logs in the set is associated with a timestamp and textual content in one or more fields. The method further includes generating, by the processor, a set of regular expressions from the preprocessed logs. The method also includes performing, by the processor, an unsupervised parsing operation by applying the regular expressions to the preprocessed logs to obtain a set of parsed logs and a set of unparsed logs, if any. The method additionally includes storing, by the processor, the set of parsed logs in a log analytics database and the set of unparsed logs in a debugging database.

6 Claims, 9 Drawing Sheets

(56) References Cited

U.S. PATENT DOCUMENTS

| | | | |
|---|---|---|---|
| 2006/0186297 A1* | 8/2006 | Lore, Sr. | B60N 3/103 248/311.2 |
| 2007/0050425 A1* | 3/2007 | Ichikawa | G06F 11/0709 |
| 2010/0211554 A1* | 8/2010 | Reid | G06F 16/2315 707/703 |
| 2011/0238397 A1* | 9/2011 | Chen | G06F 11/3672 703/13 |
| 2011/0296244 A1* | 12/2011 | Fu | G06F 11/3608 714/37 |
| 2012/0005542 A1* | 1/2012 | Petersen | G06F 11/0709 714/48 |
| 2012/0317116 A1* | 12/2012 | Sonoda | G06F 11/3006 707/737 |
| 2015/0025875 A1* | 1/2015 | Perrone | G06F 17/2785 704/9 |
| 2015/0278006 A1* | 10/2015 | Iikura | G06F 11/0793 714/2 |
| 2016/0004733 A1* | 1/2016 | Cao | G06F 11/0709 707/755 |
| 2016/0171070 A1* | 6/2016 | Hrle | G06F 16/273 707/615 |
| 2017/0236023 A1 | 8/2017 | Debnath et al. | |

* cited by examiner

TABLE 1

| Data Type | Regular Expression (RegEx Syntax) |
|---|---|
| WORD | [a-zA-Z]+ |
| NUMBER | [-+]?\d+(.\d+)? |
| IP | \d{1,3}.\d{1,3}.\d{1,3}.\d{1,3} |
| NOTSPACE | \S+ |
| DATETIME | \d{4}/(([0][1-9])\|([1][012]))/(([0][1-9])\|([12]\d)\|([3][01])) (([0-1]\d)\|([2][0-3])):[0-5]\d:[0-5]\d\.\d{3} |
| ANYDATA | .* |

FIG. 5

TABLE 2

| ID | Patterns (to be used for parsing) | Pattern-Signature |
|---|---|---|
| 1 | %{DATETIME:P1F1} login %{IP:P1F2} %{NOTSPACE:P1F3} | DATETIME WORD IP NOTSPACE |
| 2 | %{DATETIME:P2F1} DB %{WORD:P2F2} %{IP:P2F3} | DATETIME WORD WORD IP |
| 3 | %{DATETIME:P3F1} logout %{IP:P3F2} %{NOTSPACE:P3F3} | DATETIME WORD IP NOTSPACE |

FIG. 7

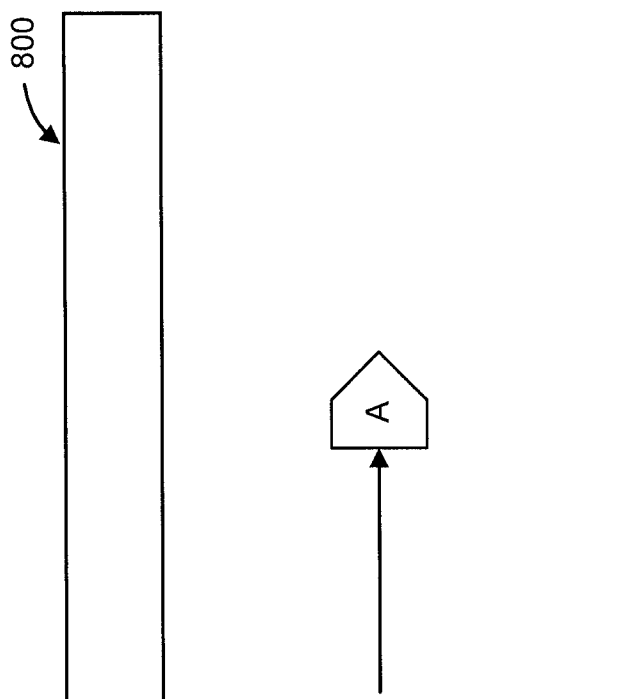

TABLE 3

| Log-Signature | Pattern-Group Lookup Sucessful | Pattern-Group | Matching Pattern | Anomaly |
|---|---|---|---|---|
| DATETIME WORD IP NOTSPACE | No | {P1,P3} | P1 | No |
| DATETIME WORD WORD IP | No | {P2} | P2 | No |
| DATETIME WORD WORD IP | Yes | {P2} | P2 | No |
| DATETIME WORD WORD IP NOTSPACE | No | {} | - | Yes |
| DATETIME WORD WORD IP NOTSPACE | Yes | {} | - | Yes |
| DATETIME WORD WORD IP  WORD | No | {P1,P3} | P3 | No |
| DATETIME WORD IP WORD | Yes | {P1,P3} | P1 | No |
| DATETIME WORD IP WORD | Yes | {P1,P3} | P3 | No |

FIG. 9

STRUCTURE-LEVEL ANOMALY DETECTION FOR UNSTRUCTURED LOGS

RELATED APPLICATION INFORMATION

This application claims priority to provisional application Ser. No. 62/431,513, filed on Dec. 8, 2016, incorporated herein by reference. This application claims priority to provisional application Ser. No. 62/544,949, filed on Aug. 14, 2017, incorporated herein by reference.

BACKGROUND

Technical Field

The present invention relates to information processing, and more particularly to structure-level anomaly detection for unstructured logs.

Description of the Related Art

A log is a semi-structured/unstructured record which carries operational information. Log analysis is the process of monitoring and extracting valuable information from logs to resolve a problem. It has a variety of usages like security or audit compliance, forensics, system operation and troubleshooting. Log analysis is the "first-attack" mechanism for any administrator to understand and manage the system. However, the large volume of logs being generated by large-scale systems continuously makes this an incredibly difficult task. For an automated log analysis system, a core step is to parse a log, and make it structured so that various log analysis task could be carried out by using the structured form of the logs. Here, we focus on building a log parsing system which can automatically parse heterogeneous logs, and if it fails to parse a log then it reports corresponding log as an anomaly.

Log Parser parses logs using patterns either learned from systems normal runs or supplied/defined by users. Here, we define "pattern" as a GROK or regular expression (RegEx). For example, for the log "Patent submitted in 2016", one of the matching GROKs (i.e., patterns) is "%{WORD:Title} submitted in %{NUMBER:Year}", and after parsing we get {"Title": "Patent", "Year": 2016} as an output in JavaScript Object Notation (JSON) format, and parsed JSON outputs can be used a building block for various log analysis tasks.

Log parsing problem using a set of patterns can be formalized as follows: given a set of m GROK patterns or regular expressions, and a set of n logs, find out the log-to-pattern mapping. Using this mapping a log can be parsed into various fields; if mapping is missing then corresponding log cannot be parsed, and it is reported as an anomalous log. Hence, there is a need for improved anomaly detection for unstructured logs.

SUMMARY

According to an aspect of the present invention, a computer-implemented method is provided. The method includes preprocessing, by a processor, a set of heterogeneous logs by splitting each of the logs into tokens to obtain preprocessed logs. Each of the logs in the set is associated with a timestamp and textual content in one or more fields. The method further includes generating, by the processor, a set of regular expressions from the preprocessed logs. The method also includes performing, by the processor, an unsupervised parsing operation by applying the regular expressions to the preprocessed logs to obtain a set of parsed logs and a set of unparsed logs, if any. The method additionally includes storing, by the processor, the set of parsed logs in a log analytics database and the set of unparsed logs in a debugging database.

According to another aspect of the present invention, a computer program product is provided. The computer program product includes a non-transitory computer readable storage medium having program instructions embodied therewith. The program instructions are executable by a computer to cause the computer to perform a method. The method includes preprocessing, by a processor, a set of heterogeneous logs by splitting each of the logs into tokens to obtain preprocessed logs. Each of the logs in the set is associated with a timestamp and textual content in one or more fields. The method further includes generating, by the processor, a set of regular expressions from the preprocessed logs. The method also includes performing, by the processor, an unsupervised parsing operation by applying the regular expressions to the preprocessed logs to obtain a set of parsed logs and a set of unparsed logs, if any. The method additionally includes storing, by the processor, the set of parsed logs in a log analytics database and the set of unparsed logs in a debugging database.

According to yet another aspect of the present invention, a computer processing system is provided. The computer processing system includes a processor. The processor is configured to preprocess a set of heterogeneous logs by splitting each of the logs into tokens to obtain preprocessed logs. Each of the logs in the set is associated with a timestamp and textual content in one or more fields. The processor is further configured to generate a set of regular expressions from the preprocessed logs. The processor is also configured to perform an unsupervised parsing operation by applying the regular expressions to the preprocessed logs to obtain a set of parsed logs and a set of unparsed logs, if any. The processor is additionally configured to store the set of parsed logs in a log analytics database and the set of unparsed logs in a debugging database.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein:

FIG. 5 is a table showing set of sample regular expression (RegEx) rules for identifying different sample data-types, in accordance with an embodiment of the present invention;

FIG. 7 is a table showing the GROK patterns used for parsing logs, in accordance with an embodiment of the present invention; and FIGS. 8-9 are a table showing sample logs to be parsed, log-signature to similar-group-pattern mapping, parsing pattern, and anomaly result after processing samples logs by the patterns of FIG. 7 in accordance with an embodiment of the present invention.

DETAILED DESCRIPTION OF PREFERRED EMBODIMENTS

The present invention is directed to structure-level anomaly detection for unstructured logs.

While prior art log parsing techniques involve an overall time complexity of O(mn), the present invention can reduce the number of involved comparisons to O(1), thus overall time complexity would be O(n). For the unmatched logs, the present invention uses O(1) comparison, while for matched logs comparison depends on the average size of the similar-pattern-group (described below). To accomplish this, in an embodiment, the present invention can involve the following three steps.

Step 1. To parse a log, we first generate a log-signature and looks up if there is a similar-pattern-group which can parse this log-signature. To speed-up lookup process, we maintain an index based on log-signature as an index "key" (see Step 3).

Step 2. If a similar-pattern-group is found, we scan all patterns in that group until the input log is parsed. If an input log cannot be parsed or group has no patterns (i.e., empty), then we report it as an anomaly.

Step 3. If no group found, we first build a similar-pattern-group (note that it could be empty). Next, we put this group in an index using log-signature as the "key", and similar-pattern-group as the "value".

We generate log-signature based on the data-type of the different tokens of a log and we also generate a pattern-signature for every pattern. For forming the similar-pattern-group, we use a dynamic programing algorithm, which takes log-signature and pattern-signature as inputs, and returns true if log-signature can be covered by the pattern-signature. If the algorithm return true, then the corresponding pattern is added to the similar-pattern-group. These and various other features of the present invention are described below.

Figure 1:
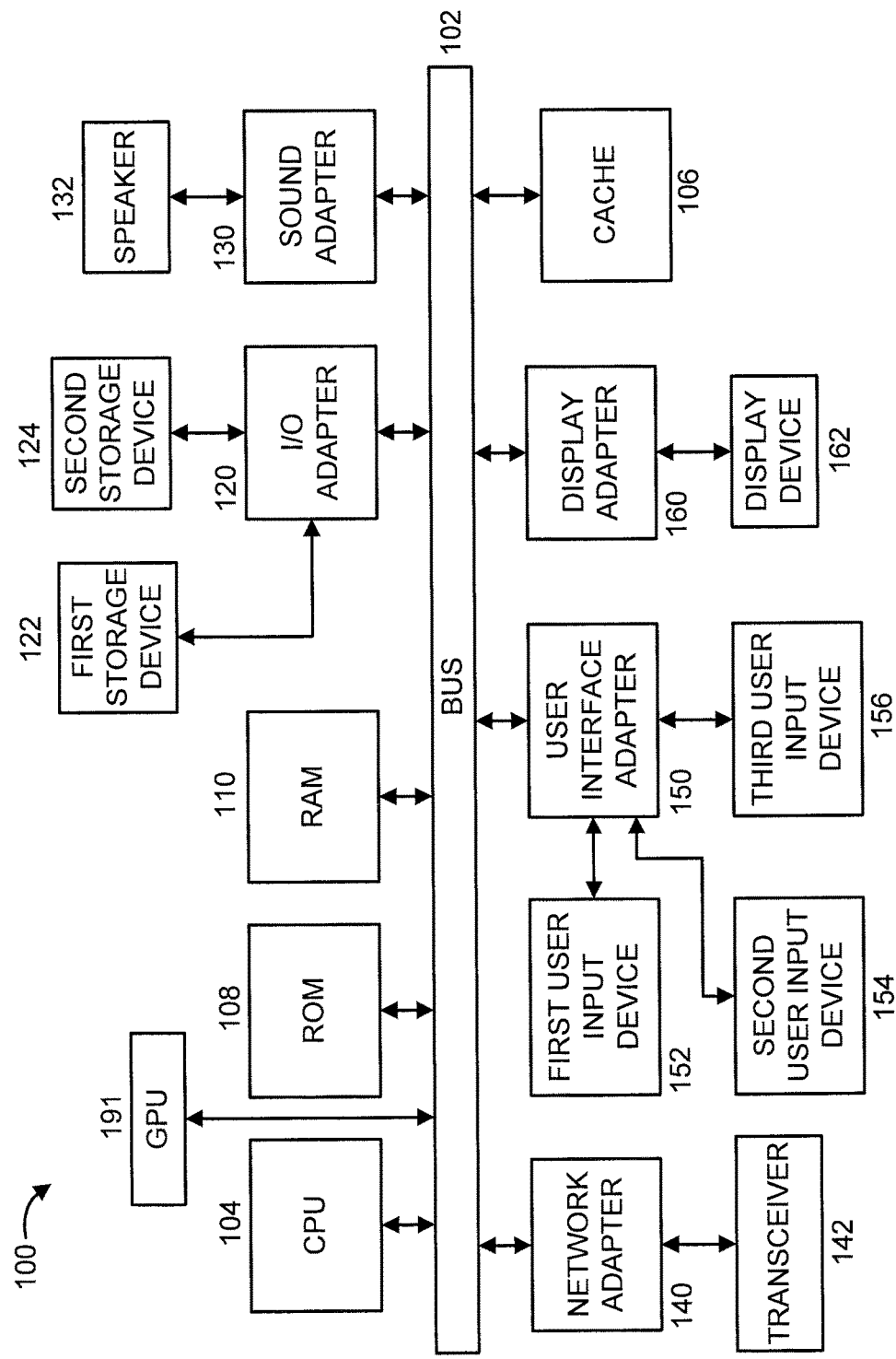
FIG. 1 is a block diagram showing an exemplary processing system to which the present principles may be applied, according to an embodiment of the present principles.

Referring now in detail to the figures in which like numerals represent the same or similar elements and initially to FIG. 1, a block diagram showing an exemplary processing system 100 to which the present principles may be applied, according to an embodiment of the present principles, is shown. The processing system 100 includes at least one processor (CPU) 104 operatively coupled to other components via a system bus 102. The system bus 102 can be formed from one or more bus types, e.g., having varying achievable communication speeds. A cache 106, a Read Only Memory (ROM) 108, a Random Access Memory (RAM) 110, an input/output (I/O) adapter 120, a sound adapter 130, a network adapter 140, a user interface adapter 150, and a display adapter 160, are operatively coupled to the system bus 102. A Graphics Processing Unit (GPU) 191 is operatively coupled to the system bus 102.

A first storage device 122 and a second storage device 124 are coupled to system bus 102 by the I/O adapter 120. The storage devices 122 and 124 can be any of a disk storage device (e.g., a magnetic or optical disk storage device), a solid state magnetic device, and so forth. The storage devices 122 and 124 can be the same type of storage device or different types of storage devices.

A speaker 132 is operatively coupled to system bus 102 by the sound adapter 130. A transceiver 142 is operatively coupled to system bus 102 by network adapter 140. A display device 162 is operatively coupled to system bus 102 by display adapter 160.

A first user input device 152, a second user input device 154, and a third user input device 156 are operatively coupled to system bus 102 by user interface adapter 150. The user input devices 152, 154, and 156 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present principles. The user input devices 152, 154, and 156 can be the same type of user input device or different types of user input devices. The user input devices 152, 154, and 156 are used to input and output information to and from system 100.

Of course, the processing system 100 may also include other elements (not shown), as readily contemplated by one of skill in the art, as well as omit certain elements. For example, various other input devices and/or output devices can be included in processing system 100, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system 100 are readily contemplated by one of ordinary skill in the art given the teachings of the present principles provided herein.

Figure 2:
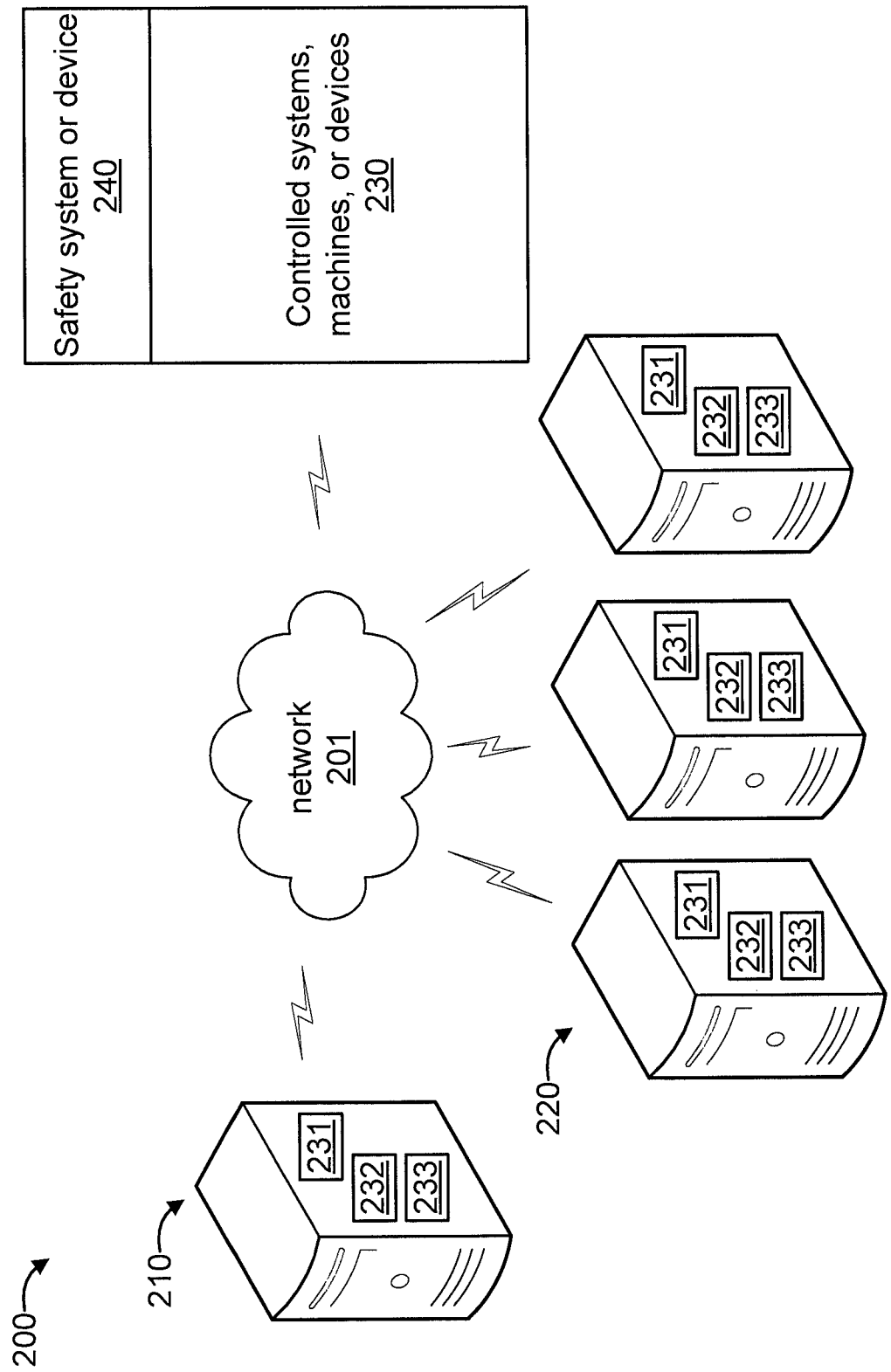
FIG. 2 is a block diagram showing an exemplary environment to which the present invention can be applied, in accordance with an embodiment of the present invention.

Moreover, it is to be appreciated that environment 200 described below with respect to FIG. 2 is an environment for implementing respective embodiments of the present principles. Part or all of processing system 100 may be implemented in one or more of the elements of environment 200.

Also, it is to be appreciated that mechanism 300 described below with respect to FIG. 2 is a mechanism for implementing respective embodiments of the present principles. Part or all of processing system 100 may be implemented in one or more of the elements of mechanism 300.

Figure 3:
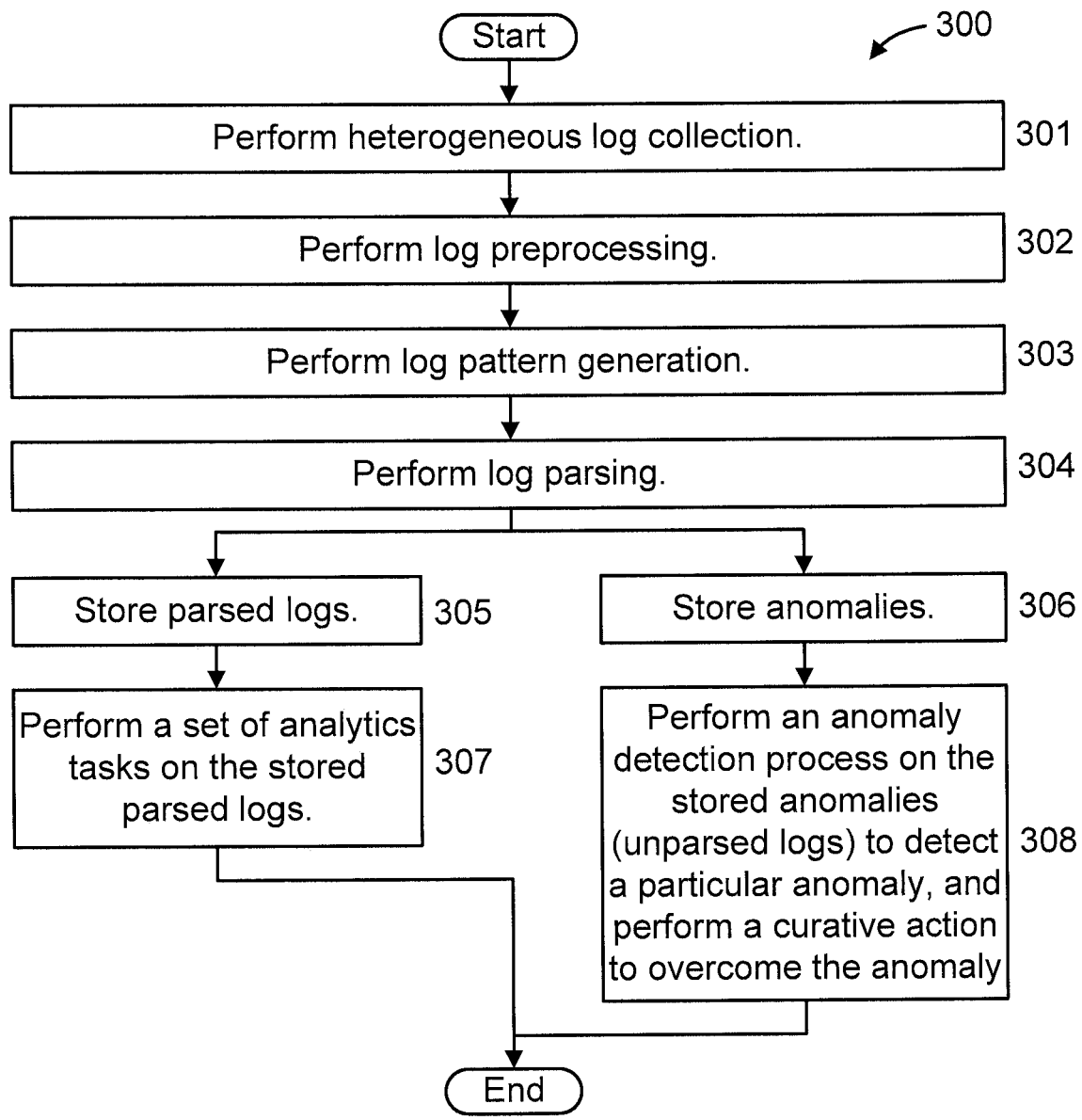
FIG. 3 is a flow diagram showings a Structure-Level Anomaly Detection (SLAD) over heterogeneous logs process, in accordance with an embodiment of the present invention.
Figure 4:
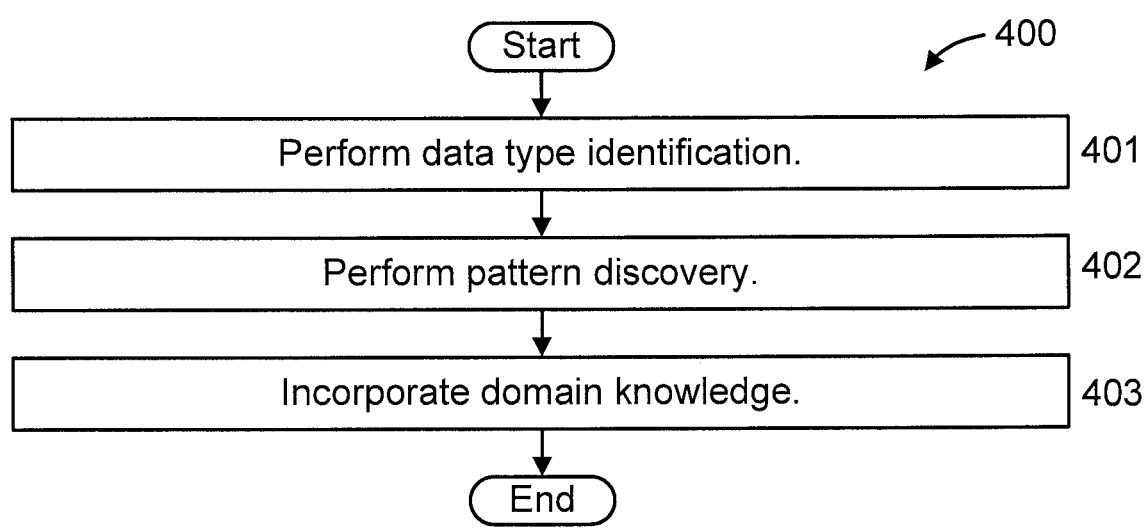
FIG. 4 is a flow diagram further showing a step of FIG. 3, in accordance with an embodiment of the present invention.
Figure 6:
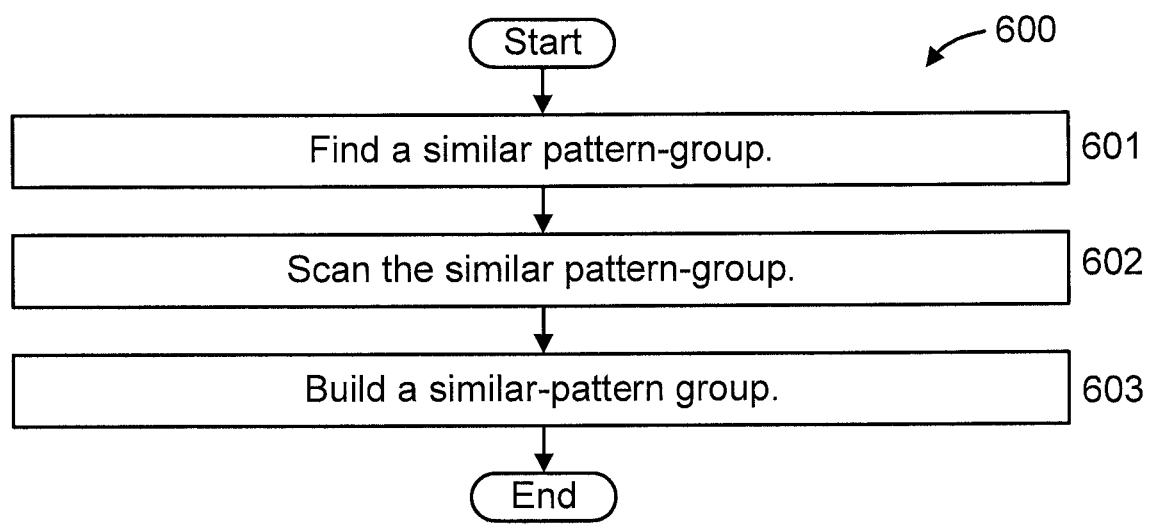
FIG. 6 is a flow diagram further showing another step of FIG. 3, in accordance with an embodiment of the present invention.

Further, it is to be appreciated that processing system 100 may perform at least part of the method described herein including, for example, at least part of method 300 of FIG. 3 and/or at least part of method 400 of FIG. 4 and/or at least part of method 600 of FIG. 6. Similarly, part or all of environment 200 may be used to perform at least part of method 300 of FIG. 3 and/or at least part of method 400 of FIG. 4 and/or at least part of method 600 of FIG. 6.

FIG. 2 is a block diagram showing an exemplary environment 200 to which the present invention can be applied, in accordance with an embodiment of the present invention. The environment 200 is representative of a computer network to which the present invention can be applied. The elements shown relative to FIG. 2 are set forth for the sake of illustration. However, it is to be appreciated that the present invention can be applied to other network configurations and other operational environments as readily contemplated by one of ordinary skill in the art given the teachings of the present invention provided herein, while maintaining the spirit of the present invention.

The environment 200 at least includes a computing node 210 operatively coupled to a set of computing nodes (e.g., servers, providers of services, etc.) 220.

Each of the computing node 210 and the computing nodes 220 at least include a processing element 231, a memory 232, and a communication device 233. The communication device 233 can be, for example, but is not limited to, a wireless transceiver, an Ethernet adapter, a Network Interface Card (NIC), and so forth.

The computing node 210 receives heterogeneous logs from the set of computing nodes 220. The computing node 210 then performs log processing, including log parsing. Successful results (parsed logs) of the log parsing can be stored in an analytics database (separate from, or included as part of the memory 232 of any of nodes 210 and/or 220) and unsuccessful results (unparsed logs) of the log parsing can be stored in an anomaly detection database (separate from, or included as part of the memory 232 of any of nodes 210 and/or 220).

The computing node 210 and/or any of the computing nodes 220 can be and/or otherwise include any type of computer processing system or device such as, but not limited to, servers, desktops, laptops, tablets, smart phones, media playback devices, and so forth, depending upon the particular implementation. For the sake of illustration, the computing node 210 and the computing nodes 220 are servers.

The computing node 210 can be configured to perform an action (e.g., a control action) on a controlled system, machine, and/or device 230 responsive to detecting an anomaly. Such action can include, but is not limited to, one or more of: applying an antivirus detection and eradication program; powering down the controlled system, machine, and/or device 230 or a portion thereof; powering down, e.g., a system, machine, and/or a device that is affected by an anomaly in another device, opening a valve to relieve excessive pressure (depending upon the anomaly), locking an automatic fire door, and so forth. As is evident to one of ordinary skill in the art, the action taken is dependent upon the type of anomaly and the controlled system, machine, and/or device 230 to which the action is applied.

In an embodiment, a safety system or device 240 can implement the aforementioned or other action, responsive to a control signal from the computing node 210. The safety system or device 240 can be used to control a shut off switch, a fire suppression system, an overpressure valve, and so forth. As is readily appreciated by one of ordinary skill in the art, the particular safety system or device 240 used depends upon the particular implementation to which the present invention is applied. Hence, the safety system 240 can be located within or proximate to or remote from the controlled system, machine, and/or device 230, depending upon the particular implementation.

In the embodiment shown in FIG. 2, the elements thereof are interconnected by a network(s) 201. However, in other embodiments, other types of connections can also be used. Additionally, one or more elements in FIG. 2 may be implemented by a variety of devices, which include but are not limited to, Digital Signal Processing (DSP) circuits, programmable processors, Application Specific Integrated Circuits (ASICs), Field Programmable Gate Arrays (FPGAs), Complex Programmable Logic Devices (CPLDs), and so forth. These and other variations of the elements of environment 200 are readily determined by one of ordinary skill in the art, given the teachings of the present invention provided herein, while maintaining the spirit of the present invention.

FIG. 3 is a flow diagram showing a Structure-Level Anomaly Detection (SLAD) over heterogeneous logs process 300, in accordance with an embodiment of the present invention.

At step 301, perform heterogeneous log collection. In an embodiment, this step can take heterogeneous logs from arbitrary/unknown systems or applications. A log message can include a timestamp and the text content with one or multiple fields.

At step 302, perform log preprocessing. In an embodiment, this step can preprocess every log by splitting it into individual units called "tokens". Splitting is done based on a set of delimiters. The default delimiter set includes white space characters (i.e., space, tab, etc.). We also allow users to provide delimiters to overwrite default delimiters in order to meet their needs. In addition, a user can provide regular expression (RegEx) based rules to split a token into multiple sub-tokens. For example, to split token "123 KB" into sub-tokens "123" and "KB", user can provide the following RegEx rule: "[0-9]+KB"→"[0-9]+KB".

At step 303, perform log pattern generation. In an embodiment, this step discovers a set of GROK patterns or regular expressions (RegEx) from the preprocessed logs using a clustering algorithm.

At step 304, perform log parsing. In an embodiment, this step can take a set of GROK or RegEx patterns as an input, and use these patterns to parse the incoming logs in the preprocessed form.

At step 305, store parsed logs. In an embodiment, all the logs that are parsed in step 304 can be stored in a database, so that later the parsed logs can be used for building other log analytics tasks/features.

At step 306, store anomalies. All the logs that cannot be parsed in step 304 are stored in a database, so that later users can inspect the unparsed logs for discovering/debugging operational problems.

At step 307, perform a set of analytics tasks on the stored parsed logs. For example, determine whether proper operation is occurring of a monitored system to which the log corresponds and if any optimizations can be made to enhance such operation (e.g., by reconfiguring available processing and/or memory resources between different processing nodes, segmenting and/or swapping out misbehaving system elements, etc.).

At step 308, perform an anomaly detection process on the stored anomalies (unparsed logs) to detect a particular anomaly, and perform a curative action to overcome the anomaly (e.g., by executing an antivirus program, reconfiguring available processing and/or memory resources between different processing nodes, segmenting and/or swapping out misbehaving system elements, etc.).

The preceding optimizations described with respect to step 307 and the preceding curative actions described with respect to step 308 are merely illustrative and, thus, other optimizations and actions can also be performed (some of which are described elsewhere herein) while maintaining the spirit of the present invention.

FIG. 4 is a flow diagram further showing step 303 of FIG. 3, in accordance with an embodiment of the present invention. In particular, FIG. 4 shows SLAD's automatic log pattern generation procedure, in accordance with an embodiment of the present invention. The patterns are generated from the preprocessed logs of step 302.

At step 401, perform data type identification. During this step, for every token we identify various data types such as DATETIME, IP, WORD, NUMBER, and NOTSPACE (i.e., mix of alphabets, digits, and symbols) based on regular expression (RegEx) rules. TABLE 1 500, as shown in FIG. 5, shows exemplary syntax for various sample data types. That is, TABLE 1 500 shows a set of sample RegEx rules for identifying different sample data-types, in accordance with an embodiment of the present invention. Identifying data types using RegEx is a quite straightforward process except the DATETIME.

We identify heterogeneous timestamps formats and unify them into a single DATETIME format "yyyy/MM/dd HH:mm:ss.SSS". However, we find that it is a very cumbersome process due to the heterogeneity of datetime formats. We also allow users to provide datetime formats to identify timestamp fields. However, if a user does not specify any formats, we identify timestamps based on a set of predefined formats (for example, MM/dd HH:mm:ss, dd/MM HH:mm:ss:SSS, yyyy/MM/dd HH:mm:ss.SSS etc.). The timestamps can be specified in a standard notation (for example, Java® SimpleDateFormat). The worst case time complexity of identifying a timestamp using a set of predefined datetime format is O(t), where t is the total number predefined datetime formats. We propose to use the following two optimizations to speed-up timestamp identification process.

(1) Caching matched formats. Using caching of matched datetime formats, we can reduce the amortized time complexity to O(1). We maintain a cache of the matched formats. Whenever a log arrives, first we start with the cached formats. If no match is found using the cached formats, then we try the remaining formats. If the log matches a format, then that format will be cached. In cache, formats are maintained in descending length order. The caching strategy works well in practice as logs from the same (or similar) sources use the same formats, and every source uses only a few different time formats to record timestamps.

(2) Filtering. We first search a set of keywords based on the most common form of specifying month (i.e., Jan-Dec, January-December, 01-12, 1-9), day (i.e., 01-31), hour (i.e., 00-59), days of the week (i.e., Mon-Sun, Monday-Sunday), and so forth, to filter out tokens which will not match any predefined formats. If a search is successful, then only we scan the predefined formats to find a match.

At step 402, perform pattern discovery. In this step, in an embodiment, we can cluster preprocessed logs based on a similarity distance. All logs within a cluster are merged together to generate one final pattern in the form of a GROK expression, and we generate one pattern for every cluster. We assign a field ID for each field. The field ID can include the following two parts: the ID of the log pattern that this field belongs to; and the sequence number of this field compared to other fields in the same pattern. The log format pattern IDs can be assigned with the integer number 1, 2, 3, . . . m for a log pattern set of size m, and the field sequence order can be assigned with the integer number 1, 2, 3, . . . k for a log pattern with k variable fields. For example, for the log "2016/02/23 09:00:31 127.0.0.1 login user1", the corresponding generated GROK pattern could be "{DATETIME:P1F1} % {IP:P1F2} % {WORD:P1F3} user1" using white space as the delimiters.

At step 403, incorporate domain knowledge. In an embodiment, we can automatically generate patterns (step 303). However, these patterns may not always meet user needs. In addition, users may want to generate patterns from one system, and later want to apply them to a different system with some modifications. A user may even want to delete some patterns or add new patterns or edit data types. To provide flexibility to users, we allow users to edit automatically generated patterns.

For every pattern, we show a GROK pattern, a sample original log message, and a corresponding preprocessed output, a count, and a GROK parsing output to the user. Using this information, users can easily understand the functionality of a pattern, and can make an editing decision. We allow users to edit data type definitions to include multiple tokens under one field. To support this feature, we introduces a new data type ANYDATA (i.e., wildcard), which is defined in TABLE 1. We also allow users to put a semantic meaning of the field by renaming generic field names. For example, we may assign "P1F1" as a generic field name for a "logTime" field, thus it may be difficult for the user to interpret a parsed output, however by renaming "P1F1" to "logTime" user can fix this issue. A user can also specialize a field; for example, a user can replace "% {WORD:P1F3}" by "login". Moreover, a user can generalize a specific token. For example, a user can replace "user1" by "% {NOTSPACE:UserName}". After editing by users, automatically generated pattern "% {DATETIME:P1F1} % {IP:P1F2} % {WORD:P1F3} user1" would be "% {DATETIME:logTtime} % {IP:P1F2} login % {NOTSPACE:User-Namer}".

From our experience, we find that pattern editing feature is very useful to users. Given millions of logs, users usually have no clue how/where to start. In contrast, by automatically generating a few patterns from these huge logs, users can easily find some clues about a system's underlying behaviors, and they can edit these patterns to incorporate their domain knowledge.

FIG. 6 is a flow diagram further showing step 304 of FIG. 3, in accordance with an embodiment of the present invention. In particular, FIG. 6 shows the details of log parsing step 304 of FIG. 3, in accordance with an embodiment of the present invention. For each log, we have its preprocessed output (step 302) and a set of GROK patterns (generated in step 303 or supplied by users).

At step 601, to parse a log, we first generate a log-signature by concatenating the data types of all its tokens. For example, for the log "2016/02/23 09:00:31.000 127.0.0.1 login user1" the corresponding log-signature would be "DATETIME IP WORD NOTSPACE". Next, we find out if there exists a similar-pattern-group which can parse this log-signature. A similar-pattern-group includes a set of candidate patterns, which can potentially parse a log having the same log-signature associated with the group. To speed-up the group lookup process, we use an index (see Step 603).

At step 602, if a similar-pattern-group is found, we scan all patterns in that group until the input log is parsed. If an input log cannot be parsed by any patterns or group has no patterns (i.e., empty), then we report that input log as an anomaly.

At step 603, if no similar-pattern-group is found, we first build a similar-pattern-group (note that it could be empty). Next, we put this group in an index using log-signature as the "key" and similar-pattern-group as the "value", and we follow step 503.

To build a similar-pattern-group, we compare an input log's log-signature with every GROK pattern using its pattern-signature (will be explained herein below) to find out all potential matching patterns out of m patterns, and put all matched patterns in one group. In a group, patterns are sorted in the ascending order of data type's generality and length (in terms of number of tokens). If no matched pattern, then the similar-pattern-group is set to empty. A similar-pattern-group is further optimized by building an index per group based on the unique tokens and their position in the GROK patterns if it contains more than one pattern. Once a similar-pattern-group is found (or formed first time) for a log-signature, we look up its all tokens with associated locations in the log-message to quickly find a GROK pattern for matching in that group's index. If we cannot find any GROK patterns from the index lookup, we simply scan all patterns in the similar-pattern-group to find the matching GROK pattern.

We generate a pattern-signature from a GROK pattern as follows. We first split a pattern into various tokens separated by white space. Next, we replace every token by a predefined data-type. For example, the token "% {DATETIME: P1F1}" is replaced by its data-type "DATETIME". If data-type is not present in the token, then we find out the data-type of the token's value. For example, the token "user1" is replaced by "NOTSPACE". Thus, the pattern-signature of the GROK pattern "% {DATETIME:P1F1} % {IP:P1F2} % {WORD:P1F3} user1" would be "DATE-TIME IP WORD NOTSPACE".

If a log-signature can be parsed by a pattern-signature, then corresponding pattern is added to the similar-pattern-group. There are two cases to consider for the pattern-signature: without wildcard (i.e., ANYDATA data type) and with wildcard(s) in a pattern. The first case is easy to handle, while handling the second case is quite challenging due to dynamicity introduced with the presence of wildcard(s).

We propose a generic solution which handles both cases efficiently. This problem can be formally defined as follows: given a log-signature of length r tokens, $L=<l_1, l_2, \ldots, l_r>$, and a pattern-signature of length s tokens, $P=<p_1, p_2, \ldots, p_s>$, we have to find out if L can parsed by P. Let us define T[i, j] to the boolean value indicating whether $<l_1, l_2, \ldots, l_i>$ is parsed by $<p_1, p_2, \ldots, p_j>$ or not. Now, this matching problem exhibits optimal substructure property, and gives the following recursive formula:

$$T[i, j] = \begin{cases} \text{true} & \text{if } i = 0 \text{ and } j = 0 \\ T[i-1, j-1] & \text{if } l_i = p_j \text{ or } isCovereed(l_i, p_j) \\ T[i-1, j] \| T[i, j-1] & \text{if } p_j = * \end{cases}$$

Based on the above formulation, the following pseudo-code outlines a dynamic programming algorithm for the log-signature to potential pattern-signature matching process per step 603, in accordance with an embodiment of the present invention:

Hence, the preceding pseudocode represents an outline of the log-signature matching by pattern-signature algorithm, in accordance with an embodiment of the present invention. In line 12 of the pseudocode, isCovered( . . . ) is a function, which returns true if the RegEx definition corresponding to the data-type of the first argument is covered by the RegEx definition of the second argument's data-type. For example, isCovered("WORD", "NOTSPACE") returns true, while isCovered("NOTSPACE", "WORD") returns false.

Now, let us explain step 601, 602, and 603 with an example relative to TABLES 2 and 3, shown in FIGS. (7) and (8-9) respectively. TABLE 2 700 of FIG. 7 shows the GROK patterns used for parsing logs, and TABLE 3 800 of FIGS. 8-9 shows the sample logs, corresponding log-signature and similar-pattern-group, parsing pattern, and anomaly results after processing all logs in accordance with an embodiment of the present invention.

The above example illustrates that our log parsing algorithm builds the similar-pattern-group the first time it sees a log not matching any of the existing log-signatures, and it needs m comparisons, where m is the total number of GROK patterns. However, for the subsequent logs having exactly same log-signature it does not build the similar-pattern-group, and it scans all patterns in that group (in the worst case when a GROK pattern could be quickly located by index based on the unique token and corresponding location) to find a matching pattern. Usually group size is much smaller than m, and that is why our algorithm runs very fast. If a similar-pattern-group is empty for matching a log-signature, our algorithm does not incur any comparison which expedites detecting some anomalous logs.

A description will now be given regarding some of the many attendant competitive/commercial advantages of the solution achieved by the present invention.

As an advantage, the parser of the present invention can work in unsupervised fashion. It does not need any prior knowledge of the log structures (or format), and can handle heterogeneous logs. It can automatically learn patterns from a set of history logs, and latter these patterns for parsing new logs, and if any new logs cannot be parsed using the learned patterns, then it tags them as anomalies.

As another advantage, we allow user modify generated patterns to incorporate their domain knowledge.

As yet another advantage, the parser of the present invention does not scan all m patterns. For parsing n logs our amortized running time is O(n), in contrast to the O(nm) running time of the linear scanning based solution.

```
boolean isMatched(String logSignature, String patternSignature) {
    String log[ ] = logSignature.split(" "); // split by white space(s)
    String pattern[ ] = patternSignature.split(" "); // split by white space(s)
    boolean T[ ][ ] = new boolean[log.length+1][pattern.length+1];
    T[0][0] = true;
    for (int i = 1; i < T.length; i++) {
        for (int j = 1; j < T[0].length; j++) {
            if (log[i-1].equals(pattern[j-1])) {
                T[i][j] = T[i-1][j-1];
            } else if (pattern[j-1].equals("ANYDATA")) { // wildcards
                T[i][j] = T[i-1][j] || T[i][j-1];
            } else if (isCovered(log[i-1], pattern[j-1])) { // does pattern-token cover log-token?
                T[i][j] = T[i-1][j-1];
            }
        }
    }
    return T[log.length][pattern.length];
}
```

As still another advantage, the parser of the present invention can handler huge number of patterns, and does not consume huge memory.

Moreover, as another advantage, we propose a fast procedure to identify timestamp fields using set of predefined datetime formats.

Embodiments described herein may be entirely hardware, entirely software or including both hardware and software elements. In a preferred embodiment, the present invention is implemented in software, which includes but is not limited to firmware, resident software, microcode, etc.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable medium such as a semiconductor or solid state memory, magnetic tape, a removable computer diskette, a random access memory (RAM), a read-only memory (ROM), a rigid magnetic disk and an optical disk, etc.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Having described preferred embodiments of a system and method (which are intended to be illustrative and not limiting), it is noted that modifications and variations can be made by persons skilled in the art in light of the above teachings. It is therefore to be understood that changes may be made in the particular embodiments disclosed which are within the scope and spirit of the invention as outlined by the appended claims. Having thus described aspects of the invention, with the details and particularity required by the patent laws, what is claimed and desired protected by Letters Patent is set forth in the appended claims.

What is claimed is:

1. A computer-implemented method, comprising:
   preprocessing, by a processor, a set of heterogeneous logs by splitting each of the logs into tokens to obtain preprocessed logs, each of the logs in the set associated with a timestamp and textual content in one or more fields;
   generating, by the processor, a set of regular expressions from the preprocessed logs;
   performing, by the processor, an unsupervised parsing operation by applying the regular expressions to the preprocessed logs to obtain a set of parsed logs and a set of unparsed logs, if any; and
   storing, by the processor, the set of parsed logs in a log analytics database and the set of unparsed logs in a debugging database;
   wherein the unsupervised parsing operation comprises identifying timestamp fields in the set of heterogeneous logs using a set of predefined datetime formats that are based on the regular expressions; and
   wherein any of the timestamp fields matching any of the predefined datetime formats are cached and initially used for subsequent matching prior to uncached ones of the predefined datetime formats.

2. The computer-implemented method of claim 1, wherein the cached ones of the predefined datetime formats are stored in a cache in a descending length order.

3. A computer-implemented method, comprising:
   preprocessing, by a processor, a set of heterogeneous logs by splitting each of the logs into tokens to obtain preprocessed logs, each of the logs in the set associated with a timestamp and textual content in one or more fields;
   generating, by the processor, a set of regular expressions from the preprocessed logs;
   performing, by the processor, an unsupervised parsing operation by applying the regular expressions to the preprocessed logs to obtain a set of parsed logs and a set of unparsed logs, if any; and
   storing, by the processor, the set of parsed logs in a log analytics database and the set of unparsed logs in a debugging database;
   wherein said parsing operation parses a particular one of the preprocessed logs by:
   generating a log signature from the particular one of the preprocessed logs;
   matching the regular expressions to the log signature to determine whether a match exists there between;
   parsing the log signature using any of the regular expressions matching thereto, responsive to the match existing; and
   generating a new regular expression to parse the particular one of the preprocessed logs, responsive to a lack of the match existing.

4. The computer-implemented method of claim 3, wherein the log signature is generated from the particular one of the preprocessed logs by concatenating data types of the tokens of the particular one of the preprocessed logs.

5. A computer program product, the computer program product comprising a non-transitory computer readable storage medium having program instructions embodied therewith, the program instructions executable by a computer to cause the computer to perform a method comprising:
   preprocessing, by a processor, a set of heterogeneous logs by splitting each of the logs into tokens to obtain preprocessed logs, each of the logs in the set associated with a timestamp and textual content in one or more fields;
   generating, by the processor, a set of regular expressions from the preprocessed logs;
   performing, by the processor, an unsupervised parsing operation by applying the regular expressions to the preprocessed logs to obtain a set of parsed logs and a set of unparsed logs, if any; and
   storing, by the processor, the set of parsed logs in a log analytics database and the set of unparsed logs in a debugging database;

wherein the unsupervised parsing operation comprises identifying timestamp fields in the set of heterogeneous logs using a set of predefined datetime formats that are based on the regular expressions; and wherein any of the timestamp fields matching any of the predefined datetime formats are cached and initially used for subsequent matching prior to uncached ones of the predefined datetime formats.

6. The computer program product of claim 5, wherein the cached ones of the predefined datetime formats are stored in a cache in a descending length order.

\* \* \* \* \*